(12) United States Patent
Shihara et al.

(10) Patent No.: US 8,681,798 B2
(45) Date of Patent: Mar. 25, 2014

(54) COMMUNICATIONS APPARATUS AND FRAME CONTROL METHOD

(75) Inventors: Shinji Shihara, Kawasaki (JP); Kenichiro Takeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 176 days.

(21) Appl. No.: 12/052,567

(22) Filed: Mar. 20, 2008

(65) Prior Publication Data

US 2008/0186973 A1  Aug. 7, 2008

Related U.S. Application Data

(63) Continuation of application No. PCT/JP2005/021995, filed on Nov. 30, 2005.

(51) Int. Cl.
*H04L 12/28* (2006.01)

(52) U.S. Cl.
USPC .......................................... 370/394

(58) Field of Classification Search
USPC ......................... 370/235, 389, 394
See application file for complete search history.

(56) References Cited

U.S. PATENT DOCUMENTS

| 5,548,593 | A * | 8/1996 | Peschi | 370/394 |
|---|---|---|---|---|
| 6,934,280 | B1 * | 8/2005 | Ho et al. | 370/352 |
| 2001/0054109 | A1 | 12/2001 | Sainomoto et al. | |
| 2004/0037224 | A1 * | 2/2004 | Choi et al. | 370/235 |
| 2006/0187911 | A1 * | 8/2006 | Huotari et al. | 370/389 |

FOREIGN PATENT DOCUMENTS

| JP | A 2001-60956 | 3/2001 |
|---|---|---|
| JP | A 2001-244982 | 9/2001 |
| JP | A 2002-9866 | 1/2002 |
| JP | A 2004-80139 | 3/2004 |
| JP | A 2005-328240 | 11/2005 |

OTHER PUBLICATIONS

NPL document RFC 791, Internet Protocol Specification, date Sep. 1981, by Information Sciences Institute, University of Southern California, Marina del Rey, California, 90291.*
Notice of Rejection Grounds issued by the Japanese Patent Office in JP 2007-547813, dated Oct. 5, 2010.

* cited by examiner

*Primary Examiner* — Chirag Shah
*Assistant Examiner* — Majid Esmaeilian
(74) *Attorney, Agent, or Firm* — Greer Burns & Crain Ltd.

(57) ABSTRACT

In a frame control method in a communications system providing a multipath function for controlling a frame having a header area and a data area, attaching, in a transmission apparatus, order information indicating a transmission order to the data area of the frame; outputting, from the transmission apparatus to a network, the frame with the attached order information, through a path selected from a plurality of paths; reading out, in a receiving apparatus, the order information from the data area of the frame received through the network; and determining, in the receiving apparatus, whether or not to transfer the received frame to a processing unit in an upper layer to process control information stored in the header area of the frame, in accordance with the read-out order information.

4 Claims, 13 Drawing Sheets

| | | | |
|---|---|---|---|
| SERIAL NUMBER 1 | RF | UF | RECEPTION BUFFER ADDRESS |
| SERIAL NUMBER 2 | RF | UF | RECEPTION BUFFER ADDRESS |
| SERIAL NUMBER 3 | RF | UF | RECEPTION BUFFER ADDRESS |
| SERIAL NUMBER 4 | RF | UF | RECEPTION BUFFER ADDRESS |
| SERIAL NUMBER 5 | RF | UF | RECEPTION BUFFER ADDRESS |
| ⋮ | | | ⋮ |
| SERIAL NUMBER n−1 | RF | UF | RECEPTION BUFFER ADDRESS |
| SERIAL NUMBER n | RF | UF | RECEPTION BUFFER ADDRESS |

COMMUNICATIONS APPARATUS AND FRAME CONTROL METHOD

CROSS REFERENCE TO RELATED APPLICATION

This application is a continuation of international PCT application No. PCT/JP2005/021995 filed on Nov. 30, 2005.

BACKGROUND OF THE INVENTION

1. Field of the Invention

The present invention relates to a technology for transmitting and receiving data in a communications system equipped with a multipath function.

2. Description of the Related Art

A communications system equipped with a multipath function in which a plurality of paths for data transmission/reception are provided between communication apparatuses has come into practical use. For example, the multipath method and the multilink Ethernet method are known for realizing the multipath function.

The multipath method realizes the multilink by using a plurality of Network Interface Cards (hereinafter referred to as NICs), making the transmission paths between NICs and a switching hub redundant and using a NIC exclusively, thereby realizing the multilink.

The multilink Ethernet method realizes the multilink by using a plurality of Ethernet (registered trademark) cards and connects the cards to a switch having a multilink Ethernet function, making transmission paths between the NICs and the switch redundant and using the NICs simultaneously. The multilink Ethernet method specifically includes MAC address distribution method, round-robin distribution method, destination IP address distribution method, source/destination IP address distribution method and so on.

In the multilink method, the order in which the receiving apparatus receives packets is not assured. In this regard, techniques has been proposed (for example, in Patent Document 1), for distinguishing a packed that has not arrived from a lost packet on the receiving apparatus side of the multilink communications system.

[Patent Document 1]
Japanese Patent Application Publication No. 2004-80139

SUMMARY OF THE INVENTION

In the four types of multilink Ethernet methods listed above, the MAC address distribution method and source/destination IP address distribution method assign one MAC address or one IP address to each communications apparatus on the transmission side and reception side, and use arbitrary one of the plurality of transmission paths provided between the communications apparatuses. Therefore, focusing a given piece of data, its transmission between the communications apparatuses is performed through a single path, making it impossible to increase the communication bandwidth.

According to the round-robin distribution method, a plurality of NICs with redundant configuration can be used substantially at the same time. Therefore, if the system is configured with two NICs having communication capacity of 1 Gbps, the communication bandwidth can be 2 Gbps. However, since the data frame is transmitted through a plurality of transmission paths, the order in which the frame arrived at the receiving apparatus cannot be assured. When the arrival order of the frames is inverted or when some frames have been discarded, the upper layer of the receiving apparatus gives rise to a data re-transmission, and that affects the data transfer performance. Moreover, all of the four methods have the problem that the more NICs are used, the higher the CPU utilization.

An objective of the present invention is to provide a technology that realizes high efficiency in frame forwarding and the optimal use of the bandwidth by multiplexing the transmission paths in a network.

In order to solve the above problem, the present invention is configured as a frame control method for controlling a frame comprising a header area and a data area in a communications system providing a multipath function, comprising attaching, in a transmission apparatus, order information indicating a transmission order to the data area of the frame; outputting, from the transmission apparatus to a network, the frame with the attached order information, via a path selected from a plurality of paths; reading out, in a receiving apparatus, the order information from the data area of the frame received through the network; and determining, in the receiving apparatus, whether or not to transfer the received frame to a processing unit in an upper layer to process control information stored in the header area of the frame, in accordance with the read-out order information.

The receiving apparatus reads out the order information indicating the transmission order of the frames transmitted from the transmission apparatus, and determines whether or not to forward the frame to the processing unit in the upper layer, making it possible to transfer the frames to the processing unit in the upper layer following the order in which the frames have been transmitted from the transmission apparatus to the network.

When the receiving apparatus detects, by analyzing the order information in each received frame, that a frame which should have been received immediately before a newly received frame has already been received, the newly received frame is forwarded to the processing unit in the upper layer, enabling the frames to be forwarded to the upper layer following the order indicated by the order information.

The method may also be configured in such a way that, when the receiving apparatus detects, by analyzing the order information in each received frame, that a frame which should have been received immediately before a newly received frame has not received, a timer is activated; the newly received frame is forwarded to the processing unit in the upper layer when the frame which should have been received immediately before the newly received frame is received within a predetermined time after the activation of the timer; and the newly received frame is discarded when the frame which should have been received immediately before the newly received frame is not received within the predetermined time after the activation of the timer. Even when the frames are not received in the order in which the frames have been transmitted, when the frames are received within a predetermined time, the frames are forwarded to the processing unit in the upper layer in the appropriate order. The configuration prevents the upper layer from issuing a re-transmitting request due to the inversion of the frame order.

According to the present invention, the prevention of the occurrence of an unnecessary data re-transmission process makes it possible to improve the data transfer efficiency.

DESCRIPTION OF THE PREFERRED EMBODIMENT

Figure 1:
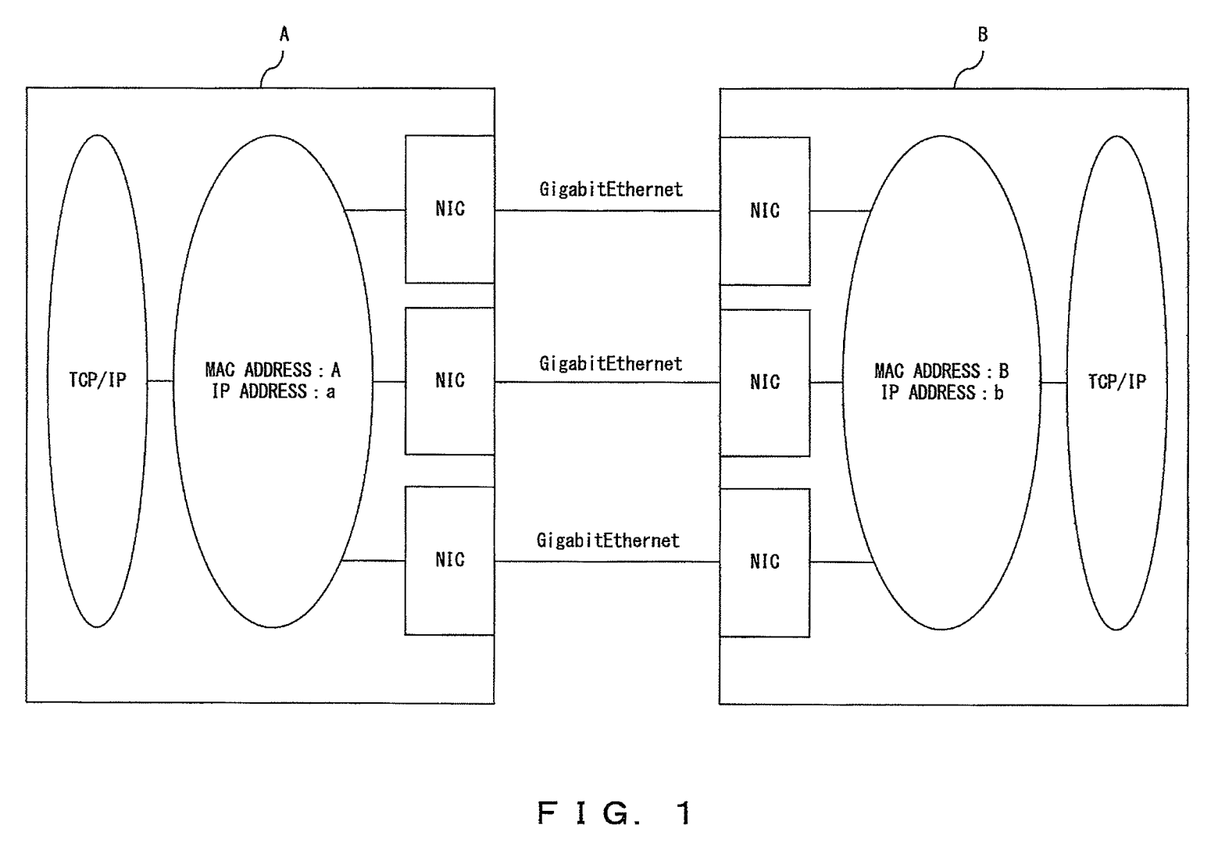
FIG. 1 is a configuration diagram of a communications system equipped with a general multipath function.

FIG. 1 is a configuration diagram of a communications system equipped with a general multipath function. For illustrative purpose, a communications system A is assumed as the data transmission side, and a communications system B is assumed as the data reception side. The communications systems at both transmission side and reception side are equipped with the multipath function. The multipath function herein refers to the function to transmit/receive data by setting a plurality of paths between communications apparatuses. The multipath function may also include a function to switch the communication paths and continue the communication, when a failure and the like is detected in a transmission path or an NIC in a system where the transmission paths between the NICs and a switching hub are made redundant with a plurality of NICs.

For example, when both of the communications systems A and B use the multilink Ethernet method, a plurality of (three, in FIG. 1) NICs are simultaneously used to perform the data transmission. Assuming that each NIC has the communication capacity of 1 Gbps, the bandwidth of 3 Gbps can be obtained by operating the three NICs simultaneously in parallel, increasing the bandwidth of the whole system. Meanwhile, the system may also be equipped with the function to continue the communication by making the transmission paths between NICs and a switching hub redundant by a plurality of NICs and switching the transmission paths when a failure is detected in the transmission path or NIC.

For example, in the case that both of the communication systems A and B shown in FIG. 1 adopt the multilink Ethernet method, data transfer is executed using a plurality of NICs (3 NICs in FIG. 1) concurrently. If it is assumed that each NIC has communication capacity of 1 Gbps, the communication bandwidth can be 3 Gbps substantially by operating 3 NICs parallel. That is, communication bandwidth is extended as a whole. The system may be equipped with the function to, when a failure is detected in a transmission path or a NIC, continue the communication by using the transmission path in which the failure is not detected.

Figure 2:
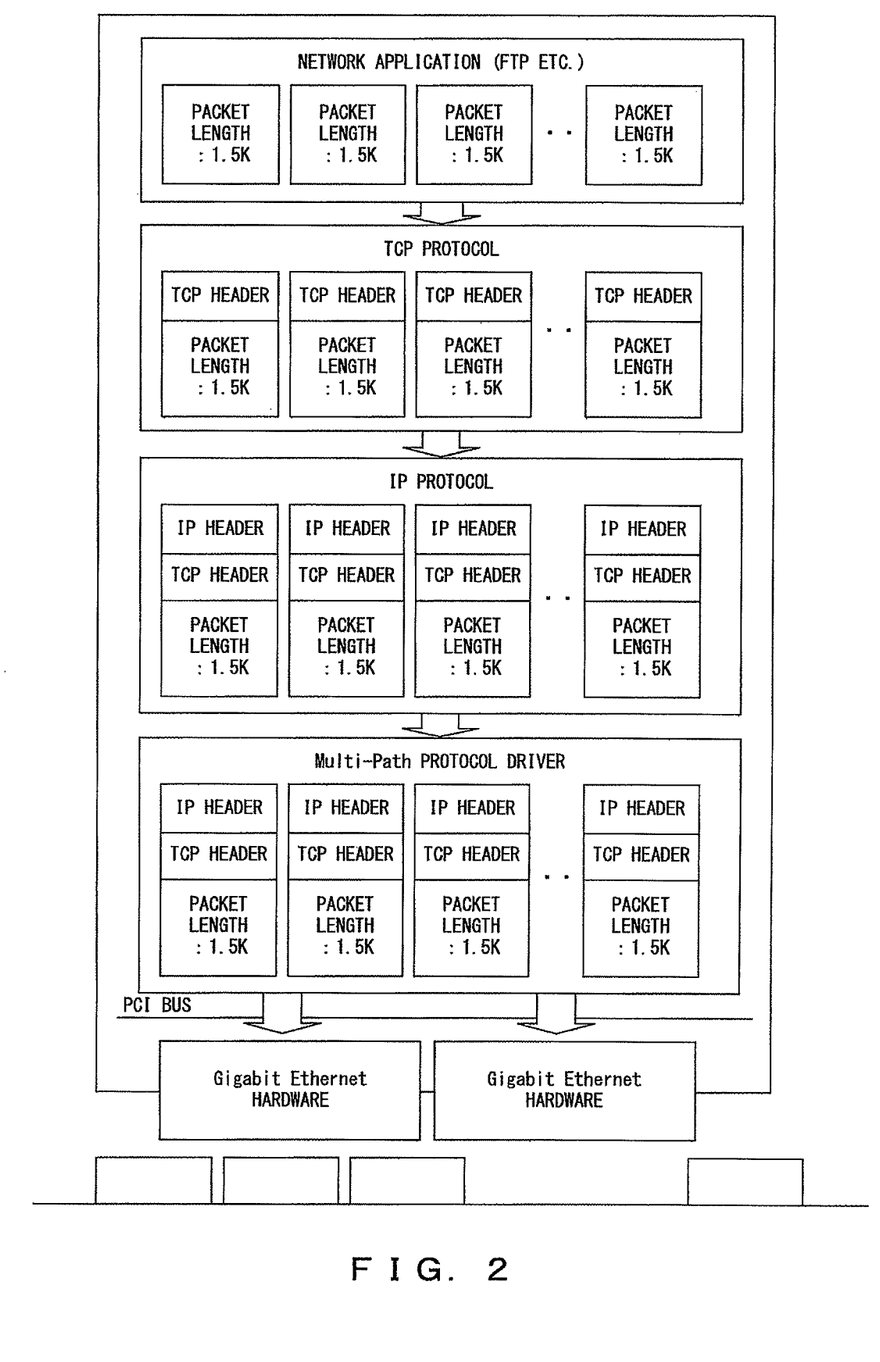
FIG. 2 is a diagram describing a data transmission process in a communications system equipped with a general multi-path function.
Figure 3:
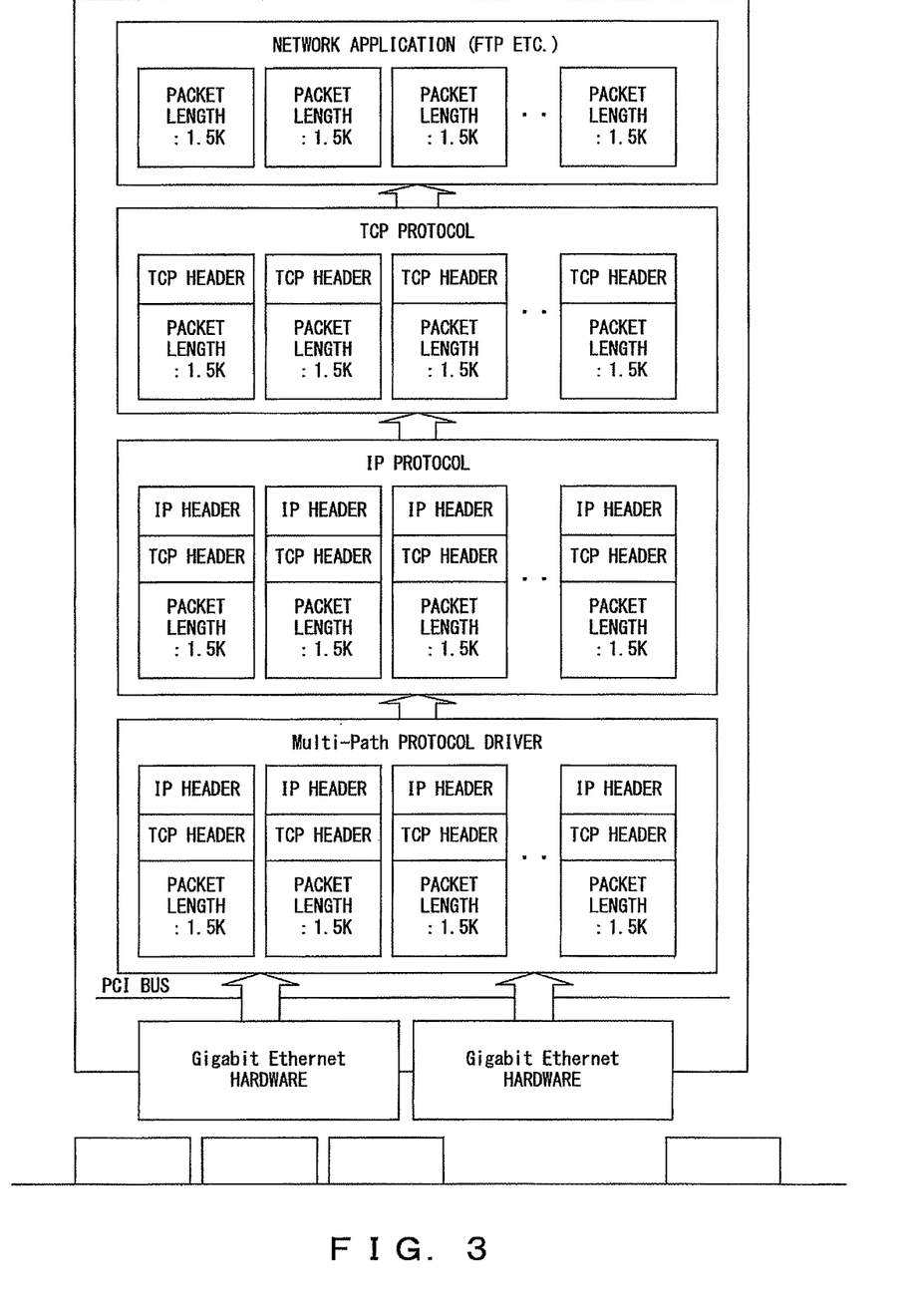
FIG. 3 is a diagram describing a data reception process in a communications system equipped with a general multipath function.

FIG. 2 and FIG. 3 are diagrams describing data transmission/reception processes in a communications system equipped with a general multipath system. In data transmission, each protocol processing unit adds a header to the data, and the data is transmitted to the network. When the receiving apparatus receives the data, each protocol processing unit erases each of the headers and the data is forwarded to the upper layer. When each protocol processing unit receives the data from lower layer, the data is temporally copied to a buffer and the like, and forwarded to the upper layer after required processes are performed.

The frame control method according to the present invention comprises a procedure to check the transmission order of the frames in a layer lower than the TCP/IP layer of the receiving apparatus, in addition to the basic procedures described in FIG. 2 and FIG. 3.

Figure 4:
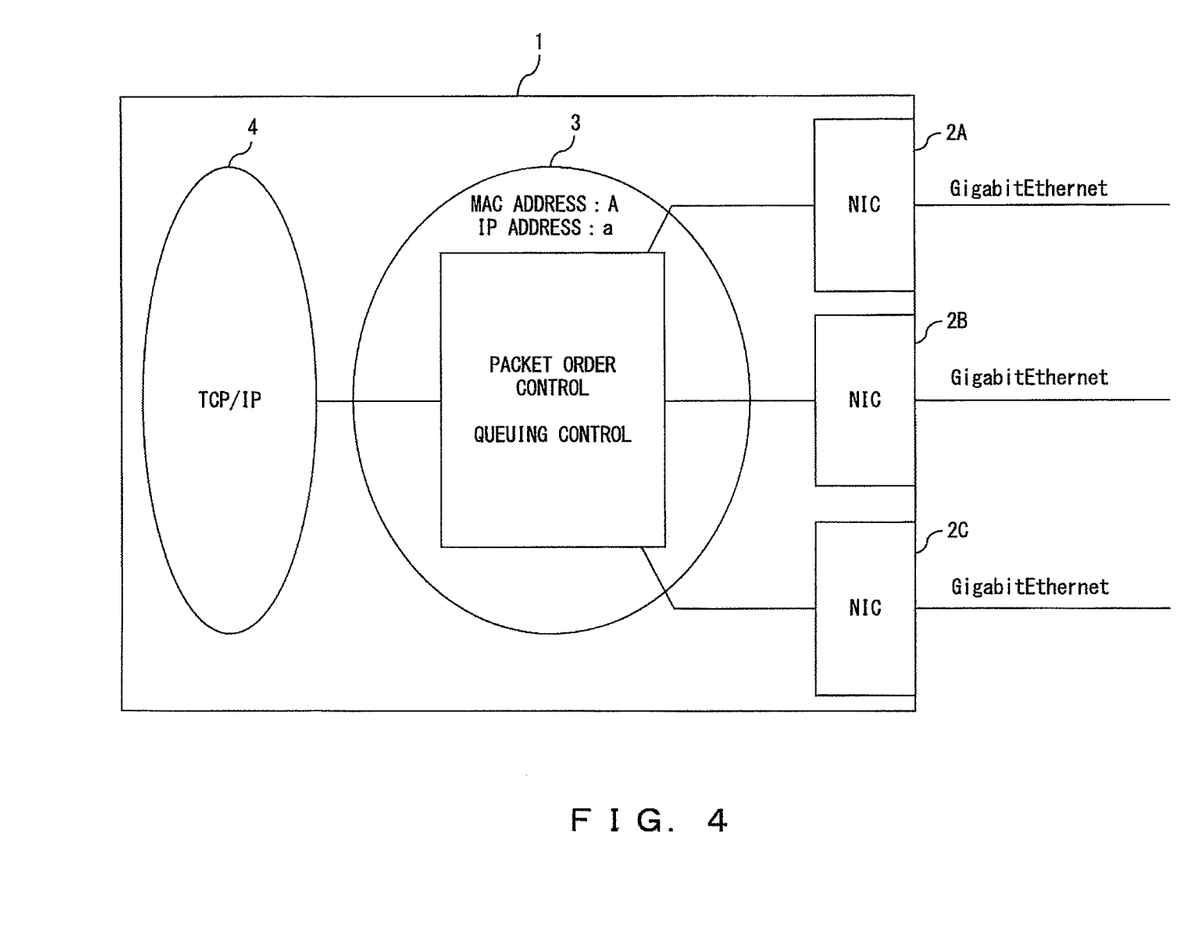
FIG. 4 is a configuration diagram of a communications system according to the present invention.

FIG. 4 is a configuration diagram of the communications system according to the present invention. A communications system 1 comprises a plurality of NIC 2s (2A, 2B, 2C). The communications system 1 passes data to the network through the plurality of NIC 2s, using the round-robin distribution method. In data transmission, information for the order control of the frames (packets) and information for queuing control are attached to the data.

Meanwhile, in data reception, a frame received through the NIC 2 is forwarded to the application layer (not shown in the drawing) through a driver layer 3 and a TCP/IP layer 4. The driver layer 3 equipped with the multipath function uses the above-mentioned frame order control information and queuing control information to perform the frame order control and queuing control. In the description hereinafter, the area storing the information for these controls may be referred to as a band control header. Note that the band control header is provided within the data area, unlike an IP header or TCP header. A preferred embodiment of the present invention is described below.

Figure 5:
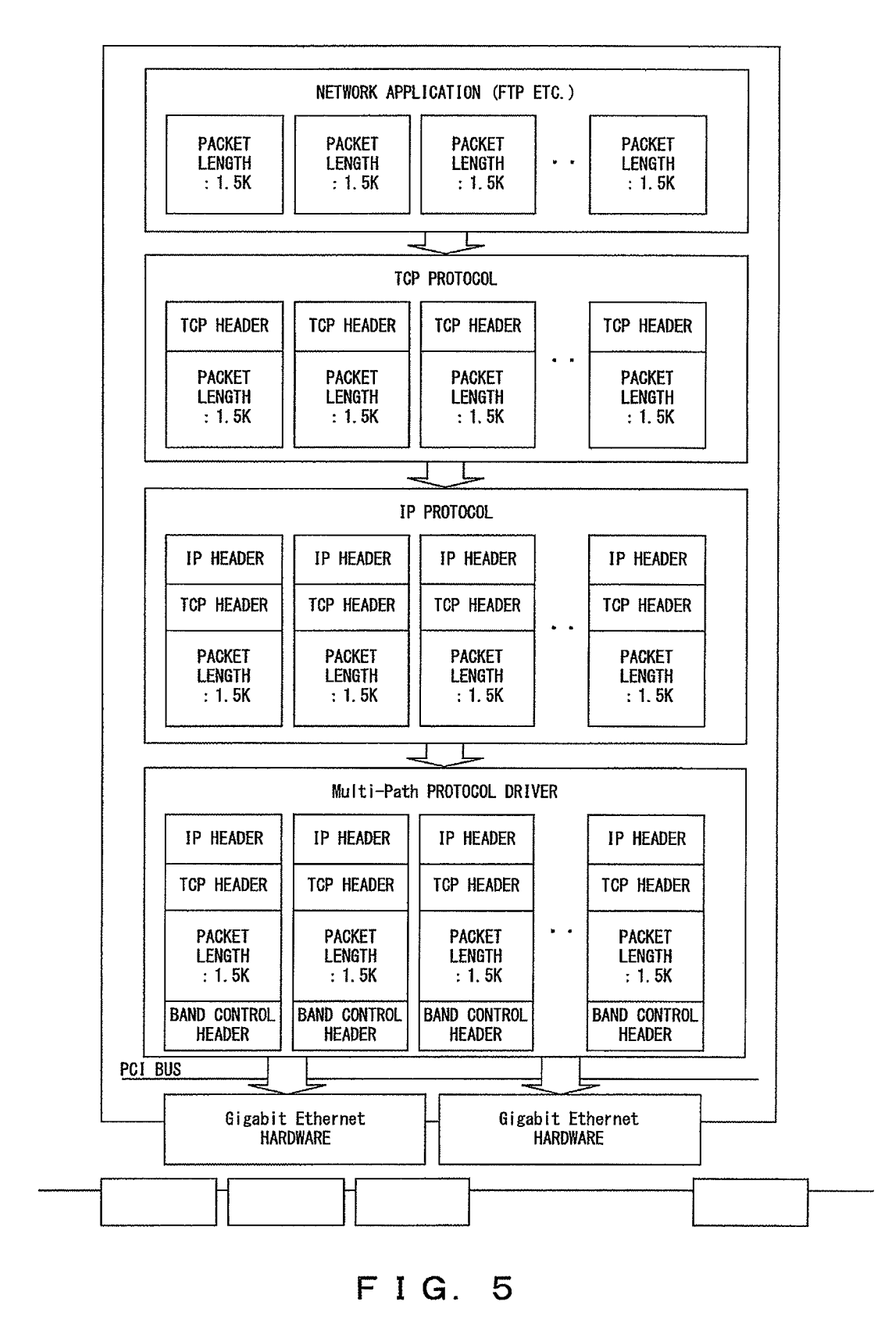
FIG. 5 is a diagram describing a frame transmission process in the communications system according the present embodiment.

FIG. 5 is a diagram describing a frame transmission process in the communications system according to the present embodiment. When a frame transmission request transmitted from a network application is received via a TCP/IP protocol processing unit, a multipath protocol processing unit first performs a negotiation process. The multipath protocol processing unit then notifies the TCP/IP layer of negotiation information obtained as a result of the negotiation process. The negotiation information contains the frame length to be transmitted/received (MTU length: Maximum Transmission Unit length). In Ethernet, the MTU length of data to be transmitted/received is generally up to 1.5 kilobytes. As for a jumbo frame, the MTU length of data to be transmitted/received is up to 9 kilobytes. According to the present embodiment, the MTU length of the frame received from the data link layer is reduced by 4 in the TCP/IP layer, in order to attach 4-byte data (i.e. a band control header) in the multipath protocol processing unit.

The multipath protocol processing unit further generates an Ethernet header to the transmission request received via the TCP/IP layer, and attaches, to the tail-end of the frame, information to be used for the order control of the frames performed on the receiving apparatus side. The "total length" of the IP header is increased by "4", and the checksum in the TCP header is reset. The frame with the band control header attached to a part of the data stream is thus passed to the network, using the round-robin method.

Figure 6:
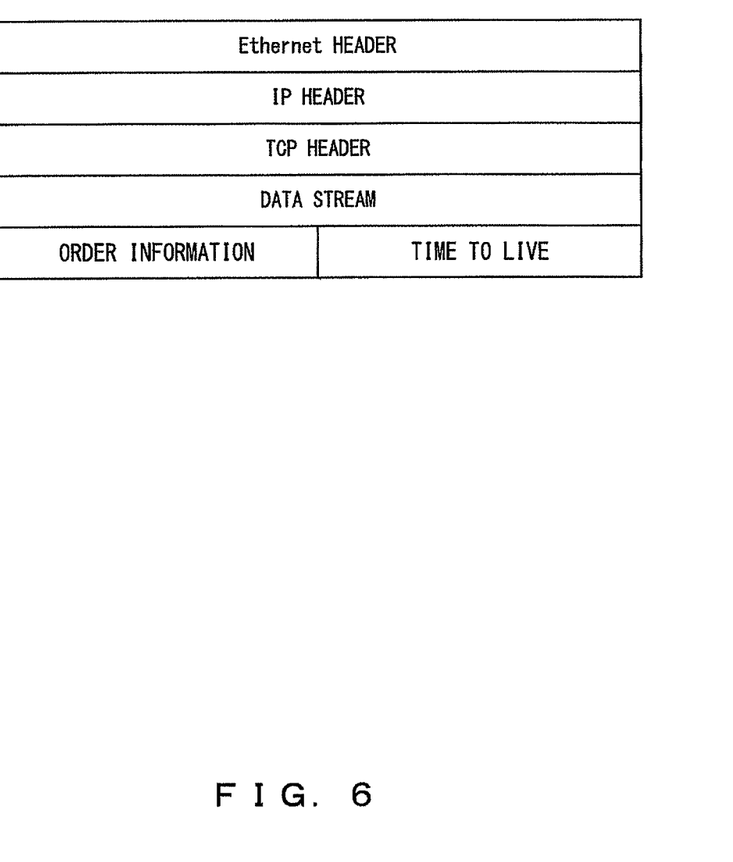
FIG. 6 is a diagram showing a format of a frame transmitted using a frame control method according to the present embodiment.

FIG. 6 is a diagram showing a format of a frame transmitted using the frame control method according to the present embodiment. The format is the same as a conventional frame format in that an Ethernet header, IP header and TCP header are attached to the front of the data stream, and the format differs in that a band control header is attached to the end of the data stream. The band control header contains order information and time-to-live information.

Figure 7:
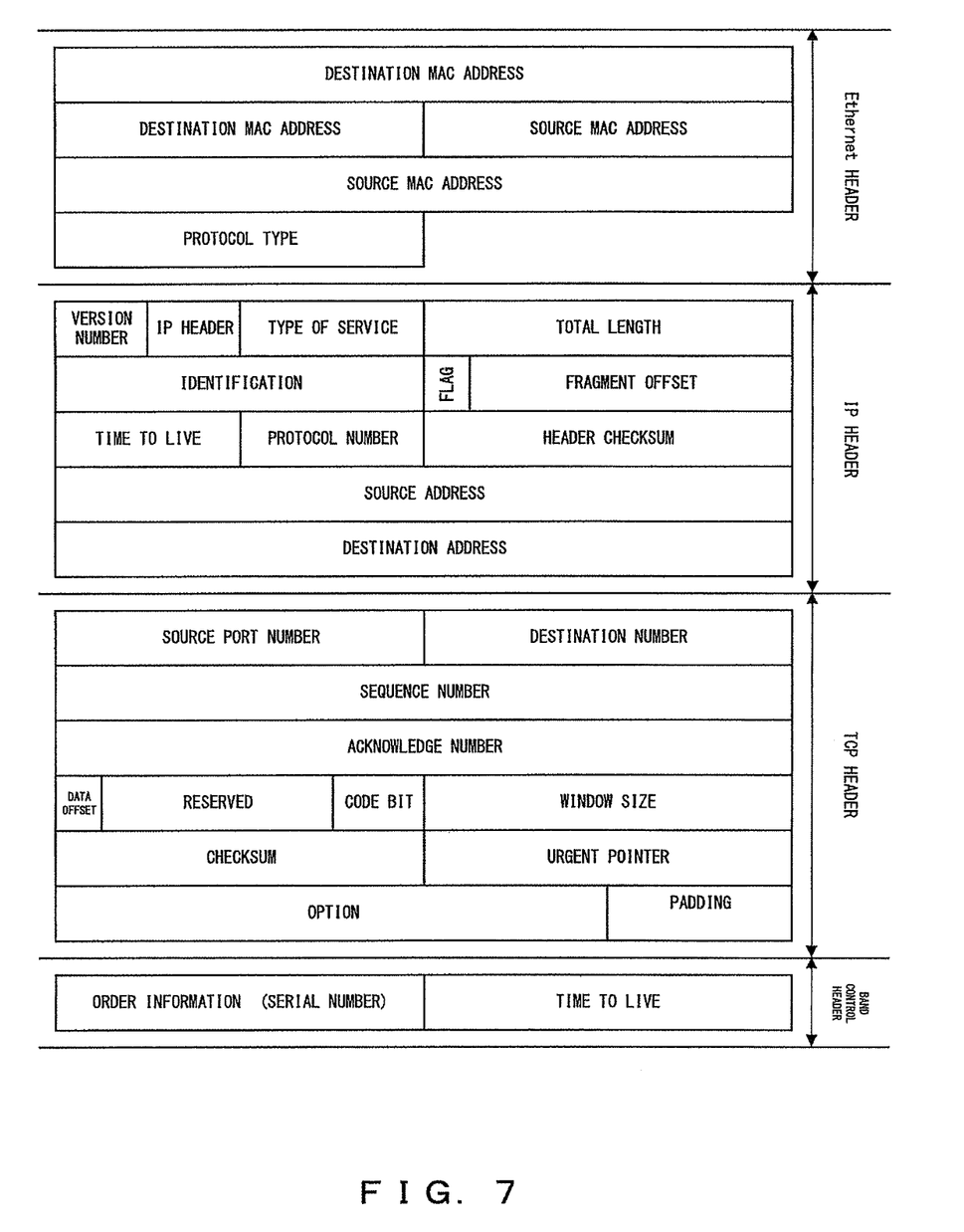
FIG. 7 shows a format of the header of the frame transmitted according to a frame control method according to the present embodiment.

FIG. 7 shows a format of the header of the frame transmitted using the frame control method according to the present embodiment. The Ethernet header is same as the conventional header format of the frame. "Total length" in the IP header is added "4", since the 4-byte band control header is attached. The TCP header stores the checksum of which value is mainly calculated from the TCP header and the data, the value including the attached band control header. The band control header contains, as mentioned above regarding FIG. 6, order information (a serial number) and time-to-live. The order information shows the order in which the frames have been sent from the transmission apparatus to the network. The time-to-live is the information about the waiting time until the multipath protocol processing unit in the receiving apparatus receives the frames that should be transmitted to the protocol processing unit in the upper layer on ahead (to be described in detail later).

The band control header is attached to the data to be transmitted/received, and used for the frame control when the frame is transmitted to the upper layer from the multipath protocol processing unit in the receiving apparatus. The term "band control header" is adopted to show that it is used for the control of the frame, not for the control of the data stream itself.

While the band control header in FIG. 7 is attached to the tail-end of the data stream in the present embodiment as mentioned above, it is not limited to this. Besides the position shown in FIG. 6, it can be attached, for example, between the TCP header and the data stream.

The receiving apparatus temporally stores the received frame in a reception buffer. The stored frame is analyzed, and when the stored frame is a TCP frame, the frame control according to the present embodiment is performed. More specifically, the receiving apparatus cannot always receive the frames in the order of the serial numbers, because the frames are transmitted from the transmission apparatus using a plurality of transmission paths in the round-robin method. Therefore, the receiving apparatus refers to the band control header of the received frames in order to forward the frames temporally stored in the reception buffer to the upper layer, following the order of the serial numbers.

Figure 8:
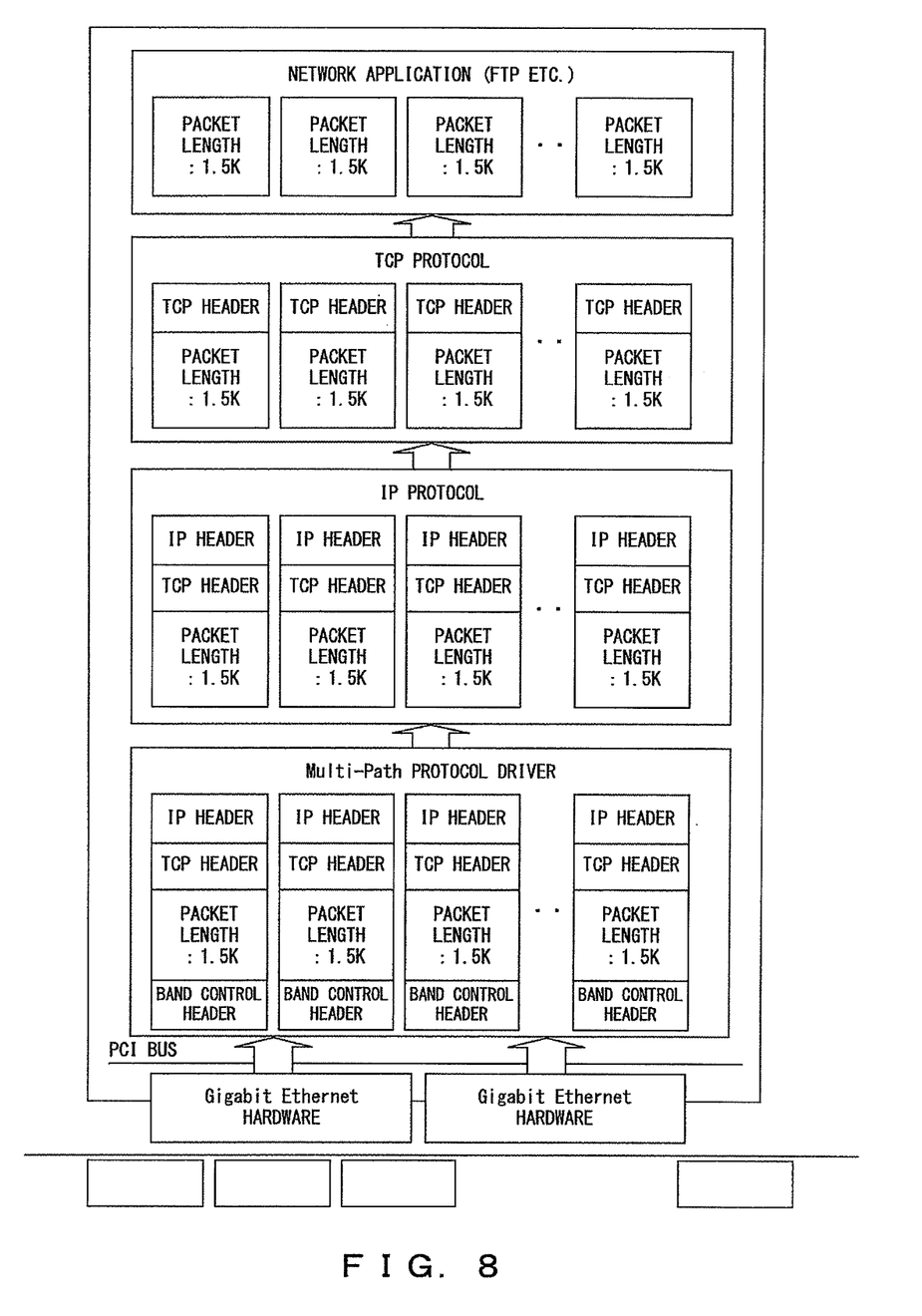
FIG. 8 is a diagram describing a frame reception process in the communications system according the present embodiment.

FIG. 8 is a diagram describing a frame reception process in the communications system according to the present embodiment. As described referring to FIG. 5-FIG. 7, according to the present embodiment, the transmission apparatus sends, to the network, a frame with the band control header attached to the tail-end of the frame, i.e. a part of the data stream area, using the round-robin distribution method. When the receiving apparatus receives the frame, the receiving apparatus performs the frame control in accordance with the band control header, and forwards at an appropriate timing, to the upper layer, the frame of which band control header is erased from the data stream.

When the frames are transmitted via a plurality of transmission paths using the round-robin distribution method, the order in which the frames are received by the receiving apparatus cannot be assured. Therefore, the multipath protocol processing unit refers to the information in the band control header, to read out and forward the frames stored in the reception buffer to the upper layer, the TCP/IP protocol processing unit, following the order shown in the band control header. Meanwhile, the multipath protocol processing unit performs a queuing process for the frames that are not received following the above order.

The queuing process is performed referring to the time-to-live information stored in the band control header. When the multipath protocol processing unit cannot receive a frame that should be forwarded to the upper layer ahead of a frame within the time-to-live, the frames having, in their band control headers, the serial numbers subsequent to the serial number of the frame are discarded by the multi protocol processing unit. When frames having serial numbers subsequent to that of a particular frame are discarded, the upper TCP/IP protocol processing determines, upon the failure of reception of a frame within a predetermined time, that a data loss has been occurred. The TCP/IP protocol processing unit then transmits a re-transmission request to the transmission apparatus.

The frames stored in the reception buffer in the receiving apparatus are controlled using reception control information. The forwarding and discarding processes of the frames are performed in the multipath protocol processing unit, referring to the reception control information. The reception control information is configured to contain information required to forward a TCP frame stored in the reception buffer to the upper layer.

Figure 9:
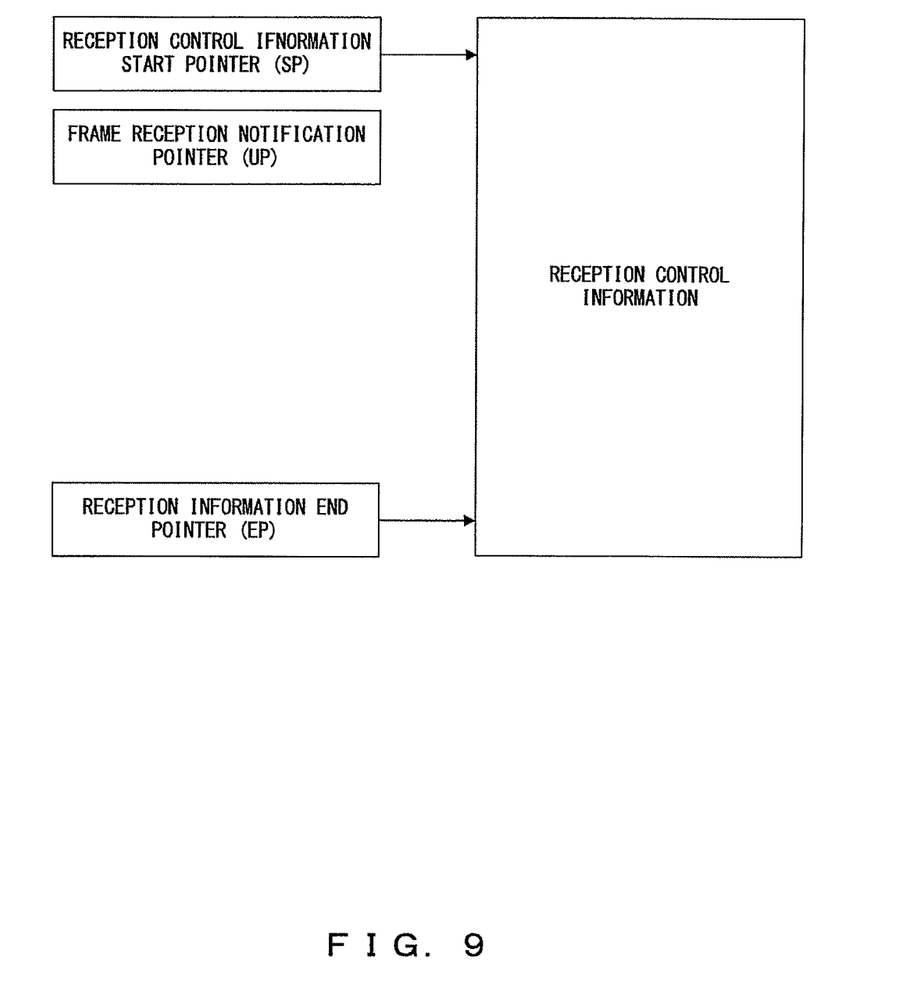
FIG. 9 is a diagram describing an example of a control method of reception control information.

FIG. 9 is a diagram describing an example of the control method of the reception control information. As shown in FIG. 9, the reception control information contains a reception control information start pointer SP, a reception control information end pointer EP, and a frame reception notification pointer UP. The reception control start pointer SP shows the location where the reception control information about the first frame in the reception control information is stored. In other words, it indicates the location in which the reception control information having the first order information, i.e. serial number 1 is stored. The reception control information end pointer EP shows the location where the reception control information about the last frame in the reception control information is stored. In other words, it indicates the location in which the reception control information having the last order information, i.e. the last serial number is stored. The frame reception notification pointer UP indicates the location in which the reception control information about the frame of which reception is to be notified to the upper protocol processing unit (in this example, the IP protocol processing unit) next is stored. Meanwhile, the starting number of the serial number is not limited to 1 as in this example. The number can be set, for example, corresponding to the sequence number in the TCP header.

Figure 10:
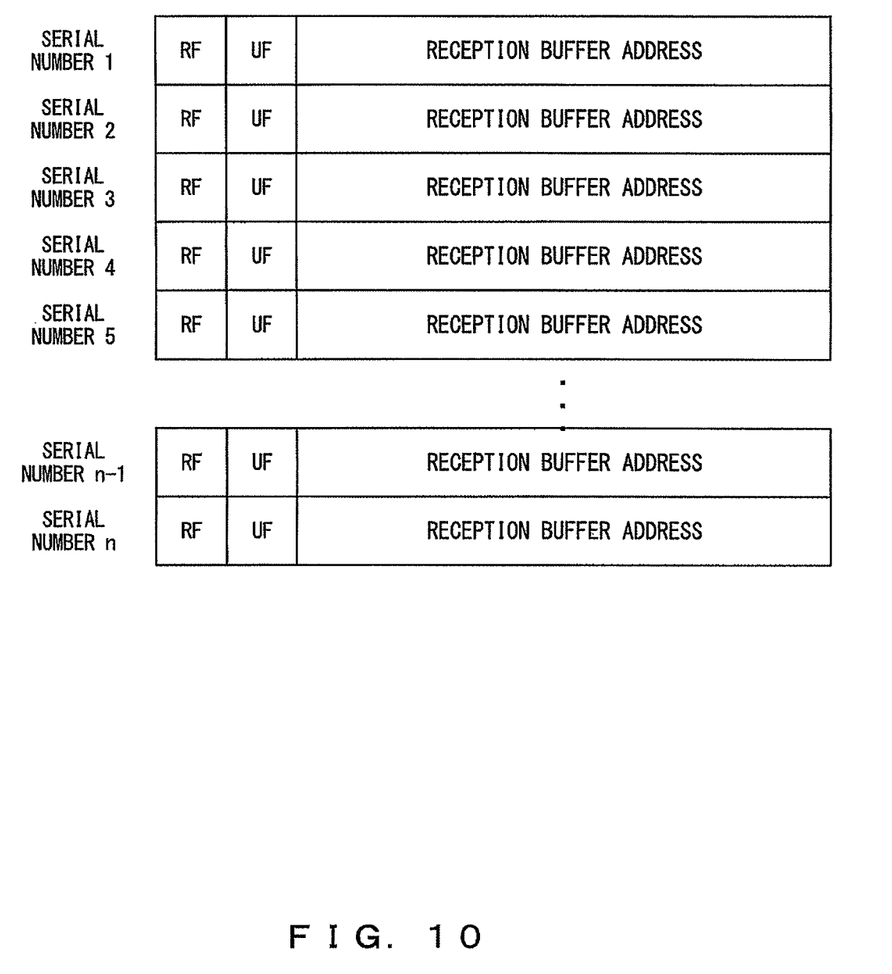
FIG. 10 shows an example of the reception control information.

FIG. 10 shows an example of the reception control information. As shown in FIG. 10, the reception control information is configured to contain a reception flag RF, a notification flag UF, and a reception buffer address for each frame. The reception flag RF is set when the frame is received, and reset when the frame is forwarded to the upper IP protocol processing unit. The notification flag UF is set when the frame is forwarded to the upper layer, and reset when the reception buffer of the frame is released. The reception buffer address stores the address of the reception buffer storing the frame having corresponding serial number, and remains valid during the period in which the reception flag RF and notification flag UF are set.

Figure 11:
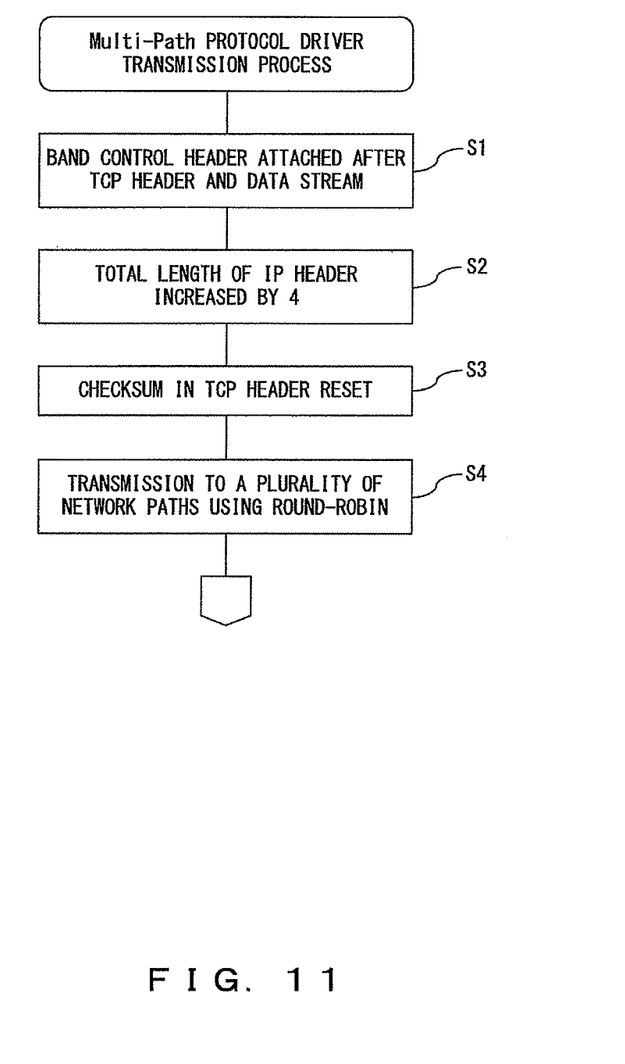
FIG. 11 is a flowchart of a transmission process of a frame in a transmission apparatus.

FIG. 11 is a flowchart showing a frame transmission process in the transmission apparatus. The process shown in FIG. 11 is performed in the multipath protocol processing unit, every time the multipath protocol processing unit receives a frame to be passed to the network.

First, in step S1, a band control header is attached after the TCP header and the data stream. The location to attach the band control header is as described above referring to FIG. 6. Next in step S2, the "total length" of the IP header is increased by "4". In step S3, the checksum of the TCP header is re-calculated and set. Finally in step S4, the process is completed by transmitting the frame to a plurality of the network paths using the round-robin distribution method.

Figure 12:
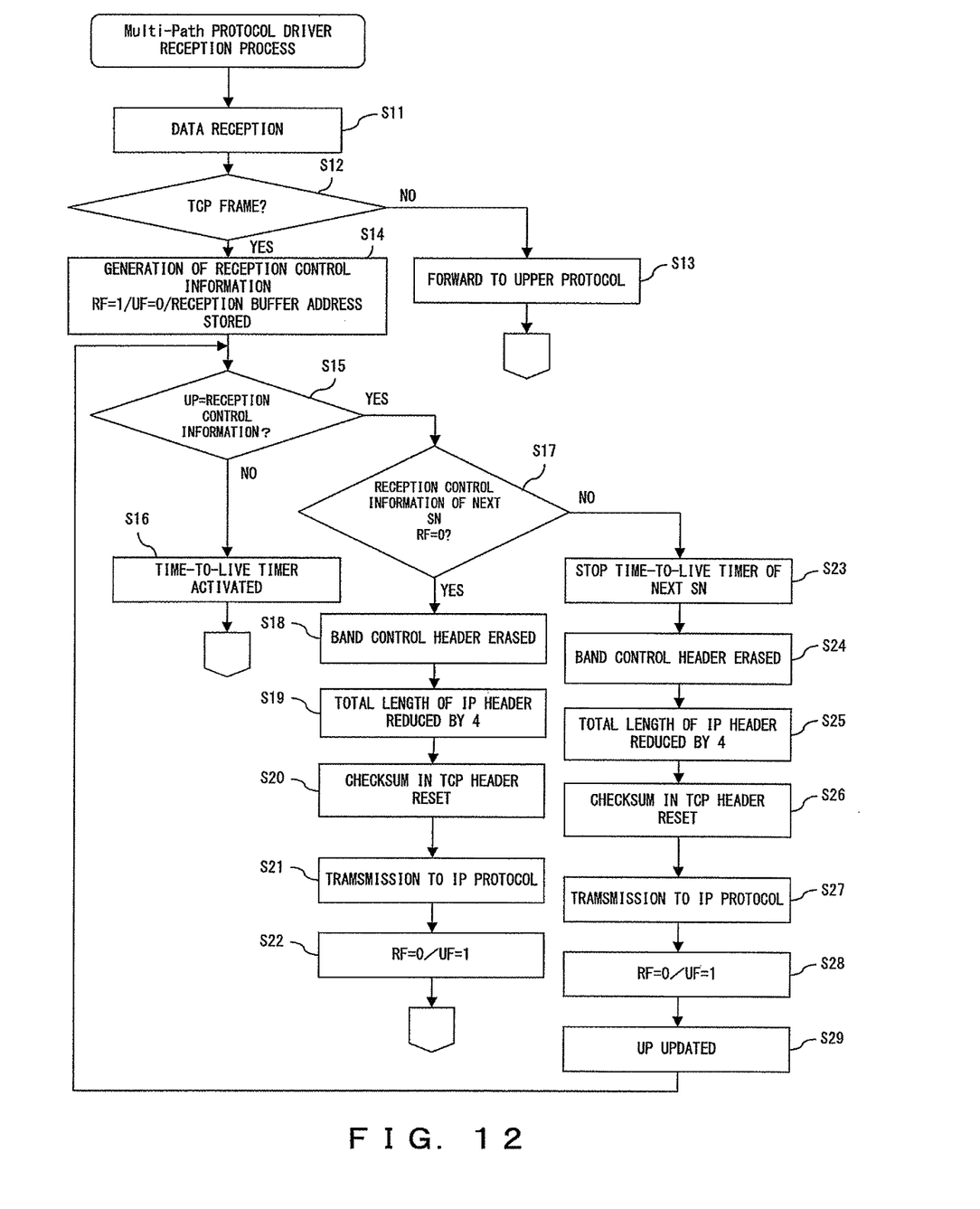
FIG. 12 is a flowchart of a reception process of a frame in a receiving apparatus.

FIG. 12 is a flowchart showing a frame reception process in the receiving apparatus. The process shown in FIG. 12 is performed in the multipath protocol processing unit, every time the multipath protocol processing unit recognizes data received through the network.

First, after data is received in step S11, a determination whether or not the received frame is a TCP frame is made in step S12. The determination is made, for example, by checking the protocol number and the like in the IP header. When the received frame is not a TCP frame, the multipath protocol processing unit transmits the data to an upper protocol processing unit and completes the process, without performing any particular process for the frame. When the received frame is a TCP frame, the process proceeds to step S14, where reception control information for the received frame is generated. At this time, the reception flag RF is set to "1", and the address of the reception buffer is stored in the reception control information.

In step S15, a determination whether or not the value of the frame reception notification pointer UP indicates the reception control information generated in step S14. When the frame reception notification pointer UP indicates reception control information of another frame, it is determined that the frame immediately before the received frame has not forwarded to the upper layer. The process then proceeds to step S16 where the time-to-live timer is activated. When the frame reception notification pointer UP indicates the reception control information generated in step S14, the process proceeds to step S17 where a determination whether the reception flag RF in the reception control information of the next serial number is "0". In other words, a determination is made regarding the next frame, whether or not the frame has already been received and its reception control information has been generated.

When the frame having the next serial number has not been received, the process proceeds from step S17 to S18 where the band control header of the frame for which the reception control information was made in step S14 is erased. The "total length" of the IP header is reduced by "4" in step S19, the checksum in the TCP header is re-calculated and reset in step S20, and the frame is transmitted to the upper protocol processing unit, i.e. the IP protocol processing unit in step S21. After the transmission of the frame, the reception flag RF is set to "0" and the notification flag UF is set to "1" in step S22 and the process is completed.

When it is determined that the frame of the next serial number has already been received in step S17, the process proceeds to step S23 where the time-to-live timer for the next serial number is stopped. Then in steps S24-S28, the same processes in step S18-S22 described above are performed. The frame reception notification pointer UP is updated, i.e., the pointer is increased by "1" in step S29, and the process returns to step S15.

Figure 13:
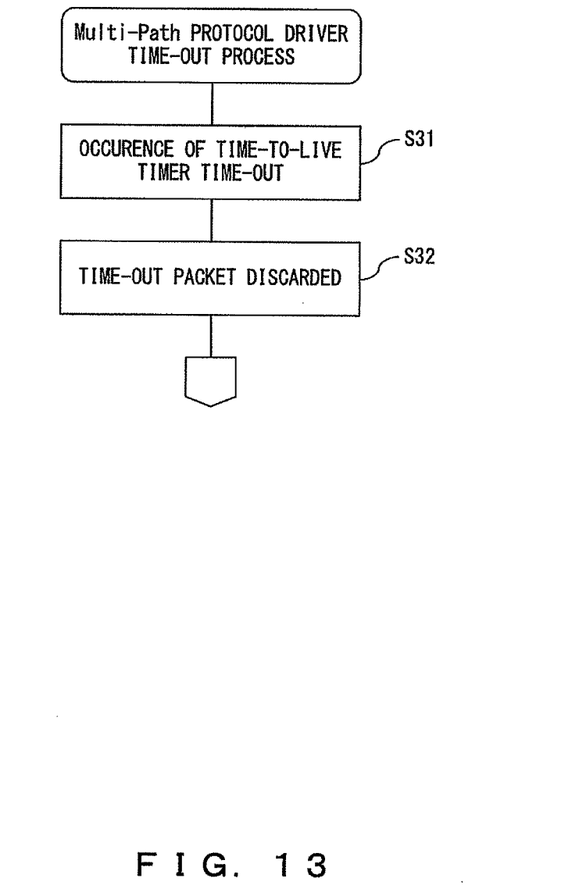
FIG. 13 is a flowchart of the process performed with the time-out of a time-to-live timer.

FIG. 13 is a flowchart of a process performed with the time-out of the time-to-live timer. The process shown in FIG. 13 is triggered by the time-out of the time-to-live timer activated in step S16 in FIG. 12.

First in step S31, when the time-out of the time-to-live timer of a given frame is recognized, the time-out frame is discarded, the reception flag and notification flag of the reception control information are set to "0", and the value of the reception buffer address is set to "0" in step S32. In the present embodiment, referring to the serial number of the discarded frame, all frames having serial numbers subsequent to that of the discarded frame are also discarded to complete the process.

As described above, in the frame control method according to the present embodiment, even when the frame are transmitted via a plurality of transmission paths and the order in which the frames are received is different from the order in which the frames have been transmitted, the multipath protocol processing unit in the receiving apparatus refers to the order information (serial number) in the band control header, making it possible to transmit the frames to the upper protocol processing unit following the order indicated by the order information. Frames that are received in an inverted order are stored in the reception buffer in the receiving apparatus for a predetermined period, in accordance with the time-to-live stored in the band control header. When the frame that should be transmitted to the upper protocol processing unit next is received within the time-to-live, the frame is transmitted to the upper layer in accordance with the order information. When the frame that should be transmitted to the upper protocol processing unit next is not received within the time-to-live, the frames having the serial numbers subsequent to the number indicated by the order information of the frame are discarded, without transmitting the frames to the upper protocol processing unit.

According to the conventional arts, regarding data transmitted using round-robin distribution method, the receiving apparatus forwarded the received frames sequentially to the upper IP protocol processing unit, regardless of the order in which the frames have been transmitted. Therefore, when an inversion of the order of the frames is recognized in the upper protocol processing unit, a re-transmission process is carried out, lowering the data transmission efficiency. By contrast, using the frame control method according to the present embodiment, even the frames received by the multipath protocol processing unit with an inverted order can be forwarded to the upper protocol processing unit following the order in which the frames have been transmitted, preventing the occurrence of an unnecessary re-transmission process and improving the transmission efficiency.

What is claimed is:

1. A frame control method for controlling a frame comprising a header area and a data area in a communications system that includes a transmission apparatus and a receiving apparatus and provides a multipath function, the frame control method comprising:
    attaching, in the transmission apparatus, to the frame, order information indicating a transmission order of the frame and time-to-live information indicating a time period after activation of a timer;
    outputting, from the transmission apparatus to a network, the frame with the attached order information, via a path selected from a plurality of paths;
    reading out, in the receiving apparatus, the order information from the data area of the frame newly received through the network;

analyzing the order information in the received frame to determine whether a preceding frame that has been transmitted from the transmission apparatus one before the newly received frame and that the receiving apparatus should have received one before the newly received frame is already received or not;

transferring the newly received frame to a processing unit in an upper layer of the receiving apparatus, when the receiving apparatus determined that the preceding frame is already received;

activating the timer by using the time-to-live information when the receiving apparatus determined that the preceding frame is not received while the newly received frame is received;

determining whether the preceding frame is received within the time period after the activation of the timer;

transferring the preceding frame to the processing unit when the preceding frame is received within the time period, and then transferring the newly received frame to the processing unit; and discarding the newly received frame that has been transmitted from the transmission apparatus one after the preceding frame when the preceding frame is not received within the time period.

2. The frame control method according to claim 1, wherein the order information in the received frame indicates the transmission order of the received frame transmitted via the path selected from the plurality of paths that are made redundant with a plurality of network interfaces.

3. A communications apparatus for receiving, via a network, a frame having order information indicating a transmission order of the frame, the frame being transmitted from a transmission apparatus in a communications system providing a multipath function, the communications apparatus comprising:

a read-out unit configured to read out the order information from the frame newly received through the network, the newly received frame including time-to-live information that indicates a time period after activation of a timer; and a determination unit configured to determine, whether or not to transfer the received frame to a processing unit in an upper layer of the communications apparatus in accordance with the read-out order information, wherein the determination unit performs:

analyzing the order information in the received frame to determine whether a preceding frame that has been transmitted from the transmission apparatus one before the newly received frame and that the communications apparatus should have received one before the newly received frame is already received or not;

transferring the newly received frame to the processing unit when the determination unit determined that the preceding frame is already received;

activating the timer by using the time-to-live information the when the determination unit determined that the preceding frame is not received while the newly received frame is received;

determining whether the preceding frame is received within the time period after the activation of the timer;

transferring the preceding frame to the processing unit when the preceding frame is received within the time period, and then transferring the newly received frame to the processing unit; and discarding the newly received frame that has been transmitted from the transmission apparatus one after the preceding frame when the preceding frame is not received within the time period.

4. The communications apparatus according to claim 3, wherein the order information in the received frame indicates the transmission order of the received frame transmitted via a path selected from a plurality of paths that are made redundant with a plurality of network interfaces.

* * * * *